M. C. PACHECO.
TOY.
APPLICATION FILED JULY 31, 1913.
1,145,165.
Patented July 6, 1915.
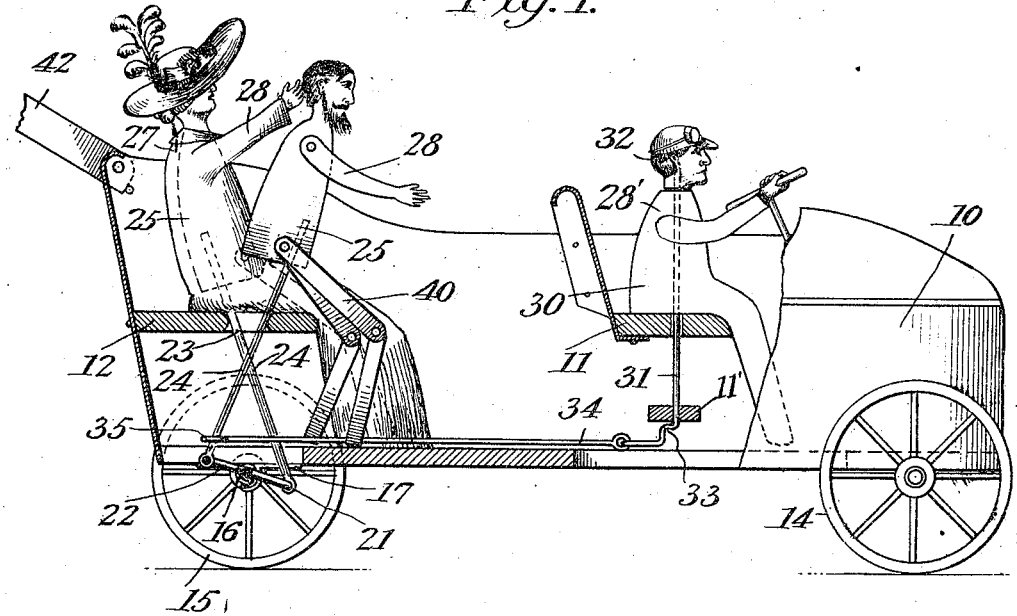
Fig. 1.
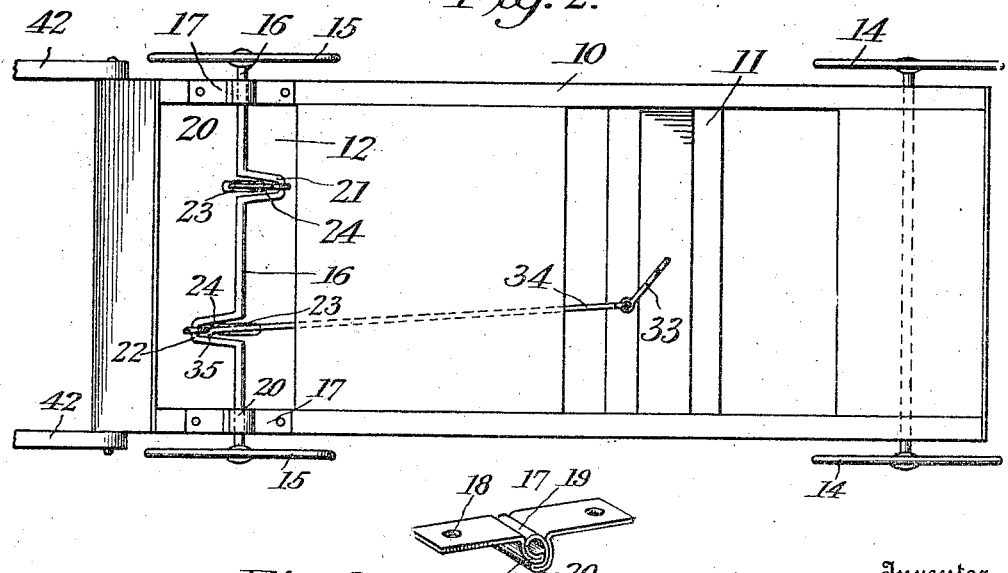
Fig. 2.
Fig. 3.
Witnesses
Chr. R. Nielsen.
O. N. Woodward
Inventor
Manuel C. Pacheco
By H. J. Woodward
Attorney

UNITED STATES PATENT OFFICE.

MANUEL C. PACHECO, OF NEW BEDFORD, MASSACHUSETTS.

TOY.

1,145,165.

Specification of Letters Patent. Patented July 6, 1915.

Application filed July 31, 1913. Serial No. 782,316.

*To all whom it may concern:*

Be it known that I, MANUEL C. PACHECO, a citizen of the United States, residing at New Bedford, in the county of Bristol and State of Massachusetts, have invented new and useful Improvements in Toys, of which the following is a specification.

The invention has for an object principally to give a construction whereby a representation of a vehicle operated by an erratic driver and excited and much-jostled passengers may be readily made.

A particular object is to provide a simple mounting and connection for the figures of the passengers, whereby a minimum number of parts will be required for supporting the figures and causing their proper movements.

Another object is to provide a novel means for securing the differential movement of the certain parts.

A further aim is to simplify the mounting of a revoluble axle with which operative connections for the figures are made.

Additional objects and advantages will appear, some of which will be apparent from the following description, and from the drawings, in which, Figure 1 is a side view of a toy embodying my invention, partly in section, Fig. 2 is a bottom view thereof, Fig. 3 is a detail of the bearing for the rear axle.

There is illustrated a miniature vehicle comprising a body 10, which may be of any automobile type having a front seat 11 and a rear seat 12. It is supported by any suitable number of wheels, four being illustrated, and the forward wheels 14 may be mounted in any desired way for idle movement under forward progress of the toy. The rear wheels 15 are secured upon a cranked axle 16, mounted upon suitable bearings 17 at each side of the vehicle body. These bearings each consist of a plain strip of metal 18, suitably apertured adjacent its ends for the reception of fasteners to hold it against the under side of the vehicle body, it being bent centrally to form a U-shaped bearing 19, and being then bent outwardly and backwardly at a sharp angle at each side of the U-shaped portion a short distance from the center, the outer portions being brought against the sides of the U-shaped portions and the outer end portions then bent to lie in a plane with or slightly beyond the bight of the U-shaped portion, these alined outer portions being adapted to engage flatly against the under side of the vehicle body.

In assembling the device, the axle having the wheels assembled thereon is simply set in the bearings 19 and by means of a pair of pliers or other suitable instrument the projecting side portions 20 are pinched together over the axle, holding it in place, the rapidity of assemblage thus made possible resulting in a material saving in cost of manufacture. The axle 16 is formed with two cranks 21 and 22 which are of fairly large radius compared to the size of the device and may be of the same or slightly different radii. The rear seat 12 is provided with two slots 23 extending longitudinally of the toy and vertically alined with respect to the crank of the axle 16. Through each of these there is projected a loose fitting figure stem 24, connected at its lower end to the adjacent crank, a small block of wood 25 being fixed on the upper end of each, cut in the form of the headed shoulders of a human being. The blocks are so formed as to permit movement of the stems to their lower limit under operation of the shaft 16. The block is provided with arms 28 which may be pivoted as desired and engaged thereon are clothes 27, such as are pleasing to children, or suitable for other reasons. The clothes may represent any desired attire and the figures may be provided with nether limbs 40, if desired.

It is important to note that the slots are centered over the axis of the axle, and have a length less than the diameter of the arc of the cranks. On this account, when the device is moved along the floor the figure stems are reciprocated, and oscillated, the oscillation being of such a nature that the figures appear to be jostled from their seats and to fall back again, as would be the case with passengers in a rapidly moving vehicle when it passes inequalities in the road surface. This is due to the fact that on upward movement of the crank, the stem being inclined forwardly it is levered against the forward end of the slot as it rises until it inclines slightly rearwardly, and as the stem moves downwardly it falls against the rear end of the slot, so that the figure appears to fall upon the seat. As the crank moves upwardly, the stem is caused to incline forward and move to the forward end of the slot, so that the preceding action is repeated. A figure 28' is fixed upon the forward seat or secured loosely thereon, representing a chauffeur, the figure in the present case comprising a body portion 30, suitably formed and dressed, through which there is extended revolubly a wire stem 31 having fixed on its upper end a suitably shaped head 32, the stem being extended through the seat 11 and double cranked thereunder as at 33, the upper crank being close against the bottom side of the seat and the lower one of greater radius extending transversely of the vehicle with the face of the head 32 presented forwardly. Connected to the outer end of this lower crank there is a link 34 having an eye 35 formed in its rear end, receiving one of the stems 24 slidably therethrough intermediately of its length. The distance of the rear end of the link above the axis of the axle determines the length of reciprocation of the link. The link is held at the proper height by sliding engagement upon the floor 37 of the vehicle body. It is largely concealed beneath the dress of the adjacent passenger figure, which is that of a lady. As shown, the legs 40 on the passenger figures are centrally jointed and pivoted to the block 27, so that they may remain upon the floor of the vehicle at all times. The toy may be moved in any suitable manner, but as shown, is adapted to be pushed from the rear by means of the pivoted handle 42. Thus, as the machine moves forward, the figures are jolted and the chauffeur caused to turn his head from side to side in a way suggesting uncertainty and making it seem that the parties are going through a dangerous experience. It is of course readily possible to operate the device by some familiar spring mechanism, so that it will be automatic, with increased realism, these details being such as to not require illustration, being well understood in the art.

What is claimed:

1. In a toy of the class described, a seat element, a slot therein, a shaft revoluble on an axis transverse to the slot centrally therebeneath and having a crank alined with the slot, a stem pivotally connected to the crank and extended slidably through the slot, and a representation of a human figure fixed upon the upper end of the stem and adapted to assume a sitting posture on the seat when at the lower limit of its movement, the slot being of a length less than the diameter of the arc of movement of the crank.

2. A bearing element, a crank shaft mounted revolubly therein including a crank, a member connected pivotally to the crank, a device to be operated connected therewith, a second device to be operated with a different degree of movement, a sliding member slidably connected with the said member and operative connections between the sliding member and said second device to be operated.

3. A toy comprising a wheeled body representing an automobile, including a front seat and a rear seat, a transverse revoluble crank shaft spaced beneath the rear seat, slots formed in the rear seat centrally over the shaft alined with the respective cranks each having a length less than the throw of the crank thereadjacent, stem members engaged in the slots loosely and connected to the cranks, representations of human figures on the upper ends of the stems, a figure on the front seat, a vertical shaft revoluble therein carrying a head for the figure and having a crank arm at its lower end, a link connected to the last named arm and engaged slidably with one of said stems and means to support the link slidably intermediately of the length of the co-engaged stem, and means to operate the shaft.

In testimony whereof I have hereunto set my hand in presence of two subscribing witnesses.

MANUEL C. PACHECO.

Witnesses:
JOHN S. PERRY,
MANUEL M. CUSTODIS.